Patented Jan. 2, 1951

2,536,751

UNITED STATES PATENT OFFICE 2,536,751

HERBICIDAL COMPOSITIONS

Jonas Kamlet, New York, N. Y., assignor to Pittsburgh Coke & Chemical Company, Pittsburgh, Pa., a corporation of Pennsylvania No Drawing. Application March 14, 1949,
Serial No. 81,405

10 Claims. (Cl. 71—2.7)

The present invention relates to new herbicidal compositions and to methods for employing the same. More particularly, it relates to a new group of herbicides or "weed killers" having a relatively very high degree of herbicidal activity and which are relatively inexpensive to produce.

The destruction of weeds becomes an economic necessity, because weeds are plants which compete with crops for water, light and mineral nutrients, increase the cost of labor and equipment, impair the quality of farm products, harbor insects and fungus pests that attack crop plants, reduce yields, cause depreciation of land values, in some cases result in the death of livestock and not infrequently impair the health of human beings. The total annual loss from weeds in the United States is estimated to be about three billion dollars. Weeds are of concern to the large land owner, the small farmer, home gardener, orchardist, vineyardist, to highway, railroad, and irrigation engineers, and keepers of parks, golf courses and cemeteries.

A variety of chemical substances have been proposed for the control of weeds. These include (a) contact herbicides, which kill weeds with which they come in contact as, for instance, by spraying, (b) translocated herbicides, which kill not only the tissues with which they come in contact, but which enter the metabolic processes of the plant and are carried deep into the roots and throughout the plant, thus killing even hardy, deep-rooted perennials, and (c) soil sterilizants, which kill the roots of the plant by sterilizing the surrounding soil.

Many of these weed-killers have objectionable features. Thus, petroleum oil sprays, sodium chlorate, dinitro-o-cresol and carbon bisulfide are inflammable or subject to fire hazard; sodium arsenate, arsenic trichloride and chlorpicrin are excessively toxic to humans and domestic animals, and sulfuric acid and sodium bisulfate are excessively corrosive to spraying equipment.

A principal object of this invention is the provision of a new variety of herbicidal compositions. A further object is the provision of herbicidal compositions containing active ingredients which are easily produced upon a commercial scale at a relatively low cost. A still further object is the provision of herbicidal compositions having a relatively high degree of herbicidal activity, which are essentially non-toxic to humans and domestic animals, which do not sterilize the soil to which they are applied, and which may be employed to control the growth of a wide variety of weeds, although they exhibit an appreciable amount of selectivity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished, according to the present invention, by the provision of herbicidal compositions containing salts of the general formula:

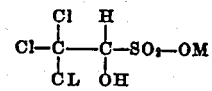

wherein M represents a cation, and a carrier therefor which does not react with the salt.

The success of the present invention is principally due to the discovery that the salts of alpha-hydroxy, beta-trichloroethyl sulfonic acid are particularly suitable as weed killers.

I have found that a good control of a wide variety of weeds can be obtained by spraying the foliage with an aqueous solution and/or suspension of one or more of the salts of alpha-hydroxy, beta-trichloroethyl sulfonic acid. These salts of alpha-hydroxy, beta-trichloroethyl sulfonic acid are particularly valuable for weed control, since they are easy and inexpensive to manufacture, they act rapidly and efficiently, they are non-inflammable and do not support combustion, they are not corrosive to equipment, and they can be applied to weeds without sterilizing the soil for other, desirable growth.

These compounds of the present invention are made by reacting equimolar proportions of chloral or chloral hydrate with an acid salt of sulfurous acid, e. g.,

The nature of the cation M is, as a rule, not of primary importance. The inorganic cations, such as sodium, potassium, ammonium, calcium, magnesium, or the like, are suitable, as are the organic cations, such as those obtained by using in the above reaction the acid sulfite of mono, di- or triethanolamine, mono, di- or triethylamine, methylamine, propylamine, primary, secondary, or tertiary butylamine, morpholine, mono-, di-, or tri-propanolamine, dodecylamine, or the like.

An interesting observation in the use of the salts of alpha-hydroxy, beta-trichloroethylsulfonic acid is the selective action of this compound against certain weeds at low concentrations, although at high concentration, they act as a general, or relatively non-selective, weed killer. They seem to act both as contact herbicides and as translocated herbicides.

The weed killer compounds of the present invention are most easily manufactured quite simply by mixing, in the cold, equimolecular amounts of chloral or chloral hydrate, and a bisulfite of the chosen cation M. Thus, if sodium bisulfite is used, the reaction $$CCl_3CHO + NaHSO_3 \rightarrow CCl_3CHOH.SO_2ONa$$

occurs very readily, and the reaction mixture sets to a crystalline cake of the sodium salt of alpha-hydroxy, beta-trichloroethyl sulfonic acid. This is broken up and dried at a temperature not in excess of 50° C.

Neutral salts of sulfurous acid may also be used, but they are inadvisable. Thus, sodium sulfite will react with chloral as follows:

$$CCl_3CHO + Na_2SO_3 + H_2O \rightarrow CCl_3CHOH.SO_2ONa + NaOH$$

The liberated mole of sodium hydroxide will then react with an additional mole of chloral, as follows:

$$CCl_3CHO + NaOH \rightarrow CHCl_3 + HCOONa$$

causing a loss of half of the chloral taken in the reaction.

It is inadvisable to use a temperature in excess of 50° C. in synthesizing the salts of alpha-hydroxy, beta-tri-chloroethyl sulfonic acid, in drying these compounds or in storing these prior to use. At temperatures in excess of 50° C., there commences a series of intramolecular reactions which destroy the herbicidal nature of the compounds.

The present invention is further illustrated by the following examples, in which all parts are by weight.

*Example I*

This example illustrates the production of sodium chloral bisulfite.

Sulfur dioxide gas is passed through a solution of 53 parts of soda ash in 120 parts of water, until 64 parts of $SO_2$ has been absorbed. To this solution of 104 parts of sodium bisulfite there is now added 147.5 parts of chloral (or 165.5 parts of chloral hydrate (mole for mole), dissolved in the smallest amount of lukewarm (30° C.) water. The reaction mixture is stirred vigorously until it sets solid. The solid cake is then broken into small pieces, and dried at a temperature not in excess of 50° C., preferably under reduced pressure. The yield of sodium salt of alpha-hydroxy, beta-trichloroethylsulfonic acid $$-(CCl_3.CHOH.SO_2ONa)$$

is quantitative, i. e., 251.5 parts.

*Example II*

This example illustrates the production of potassium-chloral bisulfite.

One hundred and twelve parts of potassium meta bisulfite is dissolved in 120 parts of lukewarm water and mixed with a solution of 147.5 parts of chloral (or 165.5 parts of chloral hydrate) (i. e., in the proportion of one mole to two moles) dissolved in the smallest amount of lukewarm (30° C.) water. The reaction mixture is stirred vigorously until it sets solid. The solid cake is then broken into small pieces and dried at a temperature not in excess of 50° C., preferably under reduced pressure. The yield of the potassium salt of alpha-hydroxy, beta-trichloroethylsulfonic acid ($CCl_3CHOHSO_2OK$) is quantitative, i. e., 267.5 parts.

*Example III*

This example illustrates the production of an ethanolamine chloral bisulfite.

149.0 parts of triethanolamine is dissolved in 621.5 parts of water, and sulfur dioxide is passed through the solution until a weight increase of 64.0 parts has occurred. To this solution of triethanolamine bisulfite is now added 147.5 parts of chloral (or 165.5 parts of chloral hydrate) in small portions, with good agitation, until a uniform solution is obtained. There is thus obtained 982 to 1000 parts of a solution containing 37.8% to 38.5% (by weight) of the triethanolamine salt of alpha-hydroxy, beta-trichloroethylsulfonic acid.

*Example IV*

This and the following examples illustrate the treatment of plants with a herbicidal composition of this invention.

Test plots comprising 20′ x 20′ squares were measured out. Check areas were placed at each end of the series of plots and one in the middle.

3″ high ragweed was sprayed with a solution containing 10% of sodium alpha-hydroxy, beta-trichloroethylsulfonate and 0.01% sodium beta-oleylethane sulfonate, the compound being applied at the rate of 75 pounds per acre. In three days, slight to moderate phytotoxicity was noted. In ten days, moderate to severe phytotoxicity was apparent. After seven weeks, none of the sprayed plants had recovered. This phytotoxicity was first manifested by a gradual chlorosis and, finally, by crushing and twisting of the leaves and stem ends and disentegration of the roots. The plants in the untreated control areas were still hardy and growing.

*Example V*

Two species of grasses, 2″ to 4″ high, were sprayed as indicated in Example IV. After three days, slight to moderate phytotoxicity was noted. After ten days, moderate to severe phytotoxicity was apparent. In two weeks, all of the grasses were dead, with no evidence of recovery or secondary growth after seven weeks.

*Example VI*

Wild phlox, 6″ high was sprayed as indicated in Example IV. After three days, slight to moderate phytotoxicity was noted. After ten days, moderate to severe phytotoxicity was apparent.

*Example VII*

A patch of poison ivy, about 50 square feet in size, was sprayed with a gallon of 38.5% solution of the triethanolamine salt of alpha-hydroxy, beta-trichlorethylsulfonic acid diluted with two gallons of water. After a week, it was noted that the leaves and stalks of the poison ivy were completely killed.

*Example VIII*

Tomato plants were sprayed with an aqueous solution of 10% sodium alpha-hydroxy, beta-trichlorethylsulfonate and 1% sorbitan monostearate. Within 24 hours, the leaves were dead and the stems had collapsed. Within 48 hours, most of the plants so sprayed were dead.

Tomato plants, sprayed with a 3.2% solution of the same salt and 1.0% sorbitan monostearate showed dead leaves and collapsed stems within 48 hours with most of the plants so treated dead in six days.

The salts of alpha-hydroxy, beta-trichloroethylsulfonic acid are suitable for use in weed control in aqueous solution, in suspension, as dusting compositions, or in some other form in which the salt is present in a carrier which does not react with the salt. They may be mixed with other compounds to give them enhanced physical characteristics, such as easy flowability, lower surface tension in aqueous solution, herbicidal specificity, etc. They may also be used in conjunction with other weed killers, such as ammonium sulfamate, sodium 2,4-dichlorphenoxyacetate, sodium thiocyanate, or the like, or with materials which exert a synergistic effect upon the salts.

The exact amount of the chloralbisulfite salt employed in the compositions in proportion to the other ingredients will depend to some extent upon the nature of the composition, i. e., whether it is a solution, a dispersion or a dry powder, and also to some extent upon the exact salt which is employed, since some of the salts have higher herbicidal characteristics than others. A general idea as to the relative proportions of the ingredients in the herbicides and the concentration in solutions as applied to growing plants can be gathered from the specific examples given above. Generally, the proportions of ingredients in the compositions are so arranged that the plants are contacted with a composition containing from 0.1% to 20% by weight of the chloroethylsulfonic acid salt. The other proportions of ingredients are varied accordingly.

Instead of being applied from aqueous media (e. g., either in solution or suspension), these new herbicides may be formulated into suitable dusting or granular compositions. When thus applied, moisture is absorbed from the foliage or the circumambient medium (i. e., the soil or the atmosphere) to provide a saturated solution of the herbicide which translocates in the plant and infuses the soil. In such dusting preparations, it is frequently advantageous to provide inert diluents, such as talc, bentonite, calcium carbonate, pyrophyllite, etc.

In aqueous solutions or suspensions, surface-active agents may conveniently be added to improve the wetting and adhesion of the plant by the herbicide.

Examples of usable materials within the general class of surface-active agents include, aliphatic sulfonic acids and their alkali metal salts, such as sodium dodecyl sulfonate, sodium 2-oleylethane sulfonate, capryl sulfonic acid or the like; aryl sulfonic acids and their salts, such as sodium keryl benzene sulfonate, butyl benzene sulfonic acid, dihexylphenol sulfonic acid, cetyldiphenyl sulfonic acid, sodium hexyltolyl sulfonate, and the like, alkyl sulfuric acids and salts thereof, such as cocoanut oil fatty acid sulfates, sodium lauryl sulfate, potassium steryl sulfate, and the like, partial fatty acid esters of pentahydric and hexahydric alcohols or pentitol or hexitol anhydride and the polyoxyalkylene derivatives of these partial esters, such as sorbitan monostearate, mannitan monolaurate, polyoxymethylene sorbitan, monolaurate, or similar surface-active agents, which do not react with the chloroethyl sulfonic acid salts. The herbicide compositions are preferably in the form of aqueous solutions in which a surface-active agent is present in concentration of 0.1 to 5% by weight of the total composition.

Solutions of the salts of alpha-hydroxy, beta-trichloroethylsulfonic acids are preferable, but in those cases where the salts are soluble in water to a limited extent, aqueous suspensions, or suspensions in non-aqueous media, of the salts are suitable for use as weed killers. Suspensions of the active salts of this invention may, however, be made in oils, such as hydrocarbon oils, naphthas or kerosene, coal tar oils, or the like, or as aqueous emulsions of such mixtures for special applications.

The term "weed" as used in the above description in its broadest sense includes all grasses and plants which continue to grow where their presence is objectionable. Thus, the term "weed" for the purposes of the present invention includes not only plants possessing certain harmful or objectionable habits or characteristics (such as poison ivy, poison oak, wild garlic, bindweed, etc), but includes as well innocuous and even decorative plants which persist in growing where their presence is undesirable (such as lawn grass, growing in a driveway, or any plants growing on the roadbed of a railroad). The same species may be considered a weed or not a weed, depending entirely upon where it grows. Weeds have been defined as plants growing where they are not wanted, or plants whose virtues have not yet been discovered. Thus, black mustard (*Brassica nigra*) occurs as an undesirable weed in forage crops which must be controlled, but when cultivated for itself yields a valuable condiment.

I claim:

1. A herbicidal composition comprising a solution of a salt of the general formula

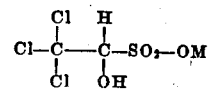

wherein M represents a cation and a surface-active agent dissolved in water.

2. A herbicidal composition as claimed in claim 1 comprising 0.1 to 20% by weight of an alkali metal salt of alpha-hydroxy, beta-trichloroethylsulfonate and 0.1 to 5% of a surface-active agent dissolved in water.

3. A herbicidal composition as claimed in claim 1 comprising sodium alpha-hydroxy, beta-trichloroethylsulfonate.

4. A herbicidal composition as claimed in claim 1 comprising potassium alpha-hydroxy, beta-trichloroethylsulfonate.

5. A herbicidal composition as claimed in claim 1 comprising triethanolamine salt of alpha-hydroxy, beta-trichloroethylsulfonic acid.

6. A herbicidal composition as claimed in claim 1, wherein said cation is the cation radical of a nitrogen base.

7. A herbicidal composition as claimed in claim 1, wherein said cation is the cation radical of an alkylamine.

8. A herbicidal composition as claimed in claim 1, wherein said cation is the cation radical of an alkanolamine.

9. A herbicidal composition consisting essentially of an aqueous solution containing 0.1 to 20% by weight of sodium alpha-hydroxy, beta-trichloroethylsulfonate and 0.1 to 5% by weight of a sodium alkylaryl sulfonate.

10. A herbicidal concentrate which may be diluted with water to yield a herbicide which consists of a solution of a surface-active agent and a salt of alpha-hydroxy, beta-trichloroethylsulfonic acid dissolved in water.

JONAS KAMLET.

REFERENCES CITED

The following references are of record in the file of this patent:

UNITED STATES PATENTS

| Number | Name | Date |
|---|---|---|
| 2,393,086 | Bousquet | Jan. 15, 1946 |

OTHER REFERENCES

Beilstein: Handbuch der Organischen Chemie, 1st ed., vol. 1 (1918), page 623.